(12) United States Patent
Crain et al.

(10) Patent No.: US 9,085,848 B2
(45) Date of Patent: Jul. 21, 2015

(54) CARPET SEAMING IRON

(75) Inventors: Lance Darrell Crain, Pleasanton, CA (US); Gregory Joseph Chambers, Morgan Hill, CA (US); Tan Dinh Nguyen, Milpitas, CA (US)

(73) Assignee: Crain Cutter Company, Inc., Milpitas, CA (US)

(*) Notice: Subject to any disclaimer, the term of this patent is extended or adjusted under 35 U.S.C. 154(b) by 489 days.

(21) Appl. No.: 13/335,873

(22) Filed: Dec. 22, 2011

(65) Prior Publication Data

US 2013/0161304 A1    Jun. 27, 2013

(51) Int. Cl.
| | |
|---|---|
| D06F 75/28 | (2006.01) |
| D06F 75/08 | (2006.01) |
| A47G 27/04 | (2006.01) |
| D06F 75/26 | (2006.01) |
| B29C 65/18 | (2006.01) |
| B29C 65/48 | (2006.01) |
| B29C 65/50 | (2006.01) |
| B29C 65/00 | (2006.01) |

(52) U.S. Cl.
CPC ............ *D06F 75/08* (2013.01); *A47G 27/0443* (2013.01); *D06F 75/28* (2013.01); *B29C 65/18* (2013.01); *B29C 65/4815* (2013.01); *B29C 65/5042* (2013.01); *B29C 66/1142* (2013.01); *B29C 66/43* (2013.01); *B29C 66/836* (2013.01); *B29C 66/8612* (2013.01); *B29C 66/87441* (2013.01); *B29C 66/91213* (2013.01); *B29C 66/91231* (2013.01); *B29C 66/91421* (2013.01); *B29C 66/91431* (2013.01); *D06F 75/26* (2013.01)

(58) Field of Classification Search
CPC ...... B29C 65/18; B29C 65/22; B29C 66/861; B29C 66/8612; D06F 75/28; H05B 1/0255; H05B 3/20–3/32
USPC ........... 156/579; 219/201, 243–247, 250–252
See application file for complete search history.

(56) References Cited

U.S. PATENT DOCUMENTS

| | | | | |
|---|---|---|---|---|
| 2,249,620 | A * | 7/1941 | Samuels ........................ | 219/245 |
| 2,530,540 | A * | 11/1950 | Reichold et al. ................ | 174/46 |
| 2,536,996 | A * | 1/1951 | Holland et al. ................. | 174/46 |
| 3,523,176 | A | 8/1970 | Hill | |
| 4,536,244 | A | 8/1985 | Greci et al. | |
| 4,714,514 | A | 12/1987 | Hoopengardner | |
| 5,028,295 | A | 7/1991 | Cracchiolo | |
| 5,333,401 | A * | 8/1994 | Klein ............................... | 38/89 |
| 5,453,150 | A | 9/1995 | Hoopengardner | |
| 5,821,458 | A * | 10/1998 | Wenzel .......................... | 174/651 |
| 5,944,943 | A * | 8/1999 | Kwok et al. ................... | 156/359 |
| 6,172,335 | B1 | 1/2001 | Goodrich | |
| 2010/0126049 | A1* | 5/2010 | Lee et al. ....................... | 38/77.8 |

* cited by examiner

*Primary Examiner* — Dana Ross
*Assistant Examiner* — Brandon Harvey
(74) *Attorney, Agent, or Firm* — Fenwick & West LLP

(57) ABSTRACT

A carpet seaming iron includes a base assembly and a top cover, within which the heating and control components are located. A bimetal thermostat, an over-temperature cutoff, and/or a thermistor and thermistor cover are secured between the base assembly and top cover by an elevated surface of the base assembly. The base assembly may include a base having an outer groove such that the top cover that fits over the base and in the outer groove of the base. To keep the cord away from a user during operation, the handle of the carpet seaming iron may also be attached to the cord by a rotatable cord guard holder that extends the cord away from the handle and a semi-rigid cord guard that reduces bending of the cord.

4 Claims, 7 Drawing Sheets

CARPET SEAMING IRON

BACKGROUND

This invention relates generally to flooring tools, and in particular to carpet seaming irons.

A carpet seaming iron is a tool commonly used in the installation of carpet in residential settings. The carpet is delivered to the home as a roll good of fixed width. A carpet installer cuts lengths of the carpet off the roll and fits them to the various rooms. As the carpet off the roll is often not as wide as the width of some rooms, seams between two pieces are often necessary. An electric carpet seaming iron is used in conjunction with carpet seaming tape to create such seams. The carpet seaming tape is placed beneath two pieces of carpet to be seamed and centered beneath the seam area. The carpet seaming iron is placed on the tape to melt the thermoplastic adhesive on the face of the carpet seaming tape. Once the thermoplastic adhesive is melted, the iron is moved forward, and the carpet backing is pressed into the molten area of thermoplastic adhesive behind the iron. Once the thermoplastic adhesive cools, the tape forms a permanent patch on the carpet's backing that effectively joins together the adjacent pieces of carpet.

In the design of a carpet seaming iron, for ease of use, it is preferred that the iron's base containing the heating element and temperature controls have as thin a profile as possible. As the iron is moved between the carpet edges in the area to be seamed, a shorter overall thickness (or height) of base creates less disturbance of the carpet that is being seamed. Furthermore, it is preferred to form ribbed surfaces called "grooves" in the base of a carpet seaming iron. These function to form the thermoplastic adhesive of the carpet seam tape into beads just prior to being pressed into the carpet backing. These beads are thought to improve the penetration of the thermoplastic adhesive as it is pressed into the rough, porous carpet backing. This works to improve the strength of the seam. In addition to grooves, some of the carpet seaming irons disclosed in the above references include even deeper "center channels" in the base which form the adhesive into a heavier bead at the center of the seam where the two carpet edges are joined. The heavy center bead can function either to strengthen the seam along its centerline, or else can "butter" the edges of the carpet being seamed to seal the edges and prevent their unraveling.

Figure 1:
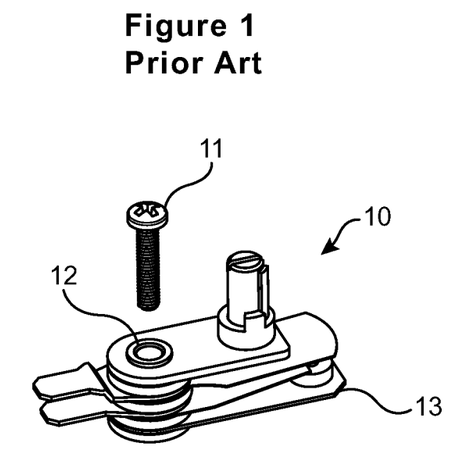
FIG. 1 illustrates an example prior art bimetal thermostat.
Figure 2:
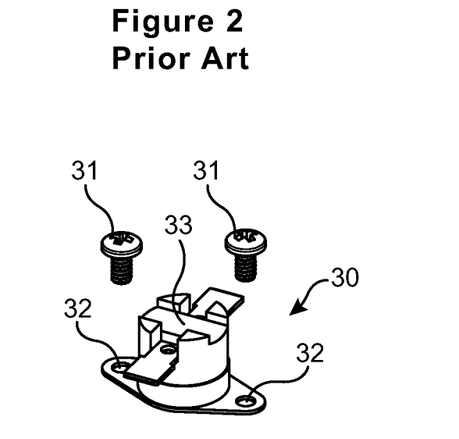
FIG. 2 illustrates an example prior art over-temperature cutoff.

These grooves and/or center channels create a problem in the manufacturing of carpet seam irons in that, within the valley area of these grooves or channels, there results an unusually thin cross-section in the base. The thin cross-sections present a problem in that it is desirable to mount certain temperature-sensing components of the carpet seaming iron directly to the base. Such components might include a bimetal thermostat, thermistor (in the case of electronic control), or over-temperature cutout. A prior art bimetal thermostat 10 including a typical fastener 11 used to fasten it to an iron base through a hole 12 is shown in FIG. 1. A prior art over-temperature cutoff 30 including two screws 31 used to fasten it to an iron base through holes 32 is shown in FIG. 2. Existing carpet seaming irons have used holes through the iron's base to mount bimetal thermostats and over-temperature cutoffs to the base, and other carpet seaming irons have mounted a thermistor to the iron base using a bracket with a screw and tapped hole.

But the use of conventional threaded fasteners and tapped holes to fasten components to the base of a carpet seaming iron can present problems. In the valley areas of grooves and channels, there is often insufficient material thickness remaining to form the necessary threads. The difficulty of tapping in such areas can result in unreliable production, a high scrap rate, and an unacceptably high number of field failures. What is needed is an improved means of fastening the necessary components to the base of the iron.

In addition, most prior art carpet seaming irons include a heat shield mounted within the assembly so that it is suspended above the base. This creates a gap between the heat shield and the base. This gap functions to reduce heat transfer between the heat shield and the base. It is preferred that the heat shield remain relatively cool (in comparison with the heating element) to protect the carpet as it passes over the heat shield. However, in order to further reduce heat transfer between the iron base and the heat shield, some irons include a gasket between the base and the heat shield. In irons including such a gasket, the gasket is normally placed on top of the iron's base. When the heat shield is fastened onto the iron, it then functions to hold the gasket down on the base.

However, providing a suitable gasket for the carpet seaming iron can be problematic because few available materials are certified to withstand the heat in this area of the carpet seaming iron (estimated up to 450 degrees). One common material is a high temperature silicone rubber, but such materials are soft, porous, and easily sliced apart when contacted by rough or sharp items such as knives that are commonly found in a tool box. What is needed is an improved means of forming a seal between the base of the iron and the heat shield.

Another unusual problem in the design of a carpet seaming iron is providing a convenient means of tending the power cord. Unlike clothes irons, in the use of a carpet seam iron, the user's focus is normally at the back of the device. This is the area where the carpet seam is put together and pressed into the molten thermoplastic adhesive. However, in the most popular carpet seam iron designs, the power cord comes out at the back of the handle and tends to get right in the way of the user's work. Hence, cord tenders have become a standard feature formed integrally as part of the handle of a carpet seaming iron specifically for the purpose of keeping the cord out of the user's way.

The most common type of prior art cord tender has a left indent, a center indent, and a right indent. A power cord can be positioned within either of the left indent or the right indent to position the cord to the right of the left, thus keeping it out of the working area at the back of the iron. The center indent is most often used to save space when the iron is put away and not in use.

Problems exist with this type of cord tender. First, the power cord must come with a strain relief over the cord jacket at the exit point from the handle. This strain relief must be flexible enough to permit positioning of the cord within the indents. However, it must also provide enough resistance to cord bending so that the cord is not easily bent into a tight radius that can damage the inner conductors.

The strain relief commonly disclosed in prior art carpet seaming irons is a "pigtail type" strain relief manufactured from steel wire and similar in appearance to a coil spring. Such pigtail-type strain reliefs terminate in a flared end to ensure a gradual bend radius at the exit of the strain relief when the cord is pulled or bent.

Problems also exist with the prior art cord tender when used in conjunction with a pigtail-type strain relief. Because the power cord and strain relief must be somewhat flexible, the power cord, even when positioned within an indent of the prior art cord tender, tends to droop under its own weight. Furthermore, as the iron is moved, the cord is pulled in the opposite direction due to being connected at the electrical receptacle at the wall. For these reasons, the cord can tend to move again towards the back of the iron, and into the way of the user's work.

To solve this problem, other prior art irons have used a "strain relief bracket," which can support and extend the power cord further away from the iron handle to the left or right. One example works with a prior art cord tender and pigtail-type strain-relief. It consists of a tubular section with a jaw on one end and a distal end forming the exit location for the cord. The tubular section may have a longitudinal slot allowing it to fit over the body of the pigtail strain relief. Thus, to affix the bracket over the pigtail strain relief, the user slightly tugs on the flared end of the pigtail-type strain relief to lengthen it, and then fits the tubular section over the strain relief. When the flared end is released, the spring retracts against distal end of the device, holding it in position. The opposite jaw end of the device is designed to be positioned within the cord tender and hook itself within the valley formed by the left and right indents.

The strain relief bracket can be made from any semi-rigid material such as plastic, wood, or metal, and it may be formed as a single piece by molding. The device may not have the longitudinal slot, and is therefore meant to be permanently mounted to the assembly of the cord and strain relief, or the bracket may be mounted to the end of the iron handle using a ball joint and socket arrangement with the socket provided on the end of the handle and a ball joint extending from the end of the spacer arm. The spacer arm may be a top portion of a jaw area where strain relief bracket is hooked onto the cord tender portion of the iron handle. Relative to the handle, the spacer arm is a proximate end of the device. Such a bracket would conceivably be made from the same "semi-rigid" plastic, wood, or metal material.

One prior art iron uses a strain relief having a ball-shaped end that is formed through the joining of two end components. Both components may be made from a semi-rigid material, but on the "ball end" of the strain relief the iron also includes a round flanged shape. The two halves of the handle, when fastened together, internally form a pair of walls that retain this flange, while also permitting it to rotate. The iron thus includes a semi-rigid strain relief with an elongate tubular section that can rotate within its confines in the first handle half and second handle half. This achieves the object of extending the cord a distance away from the working area at the back of the iron.

But the strain relief bracket of this design has a problem in that the semi-rigid construction that provides the benefit of extending the cord also tends to defeat the function of the underlying strain relief. As the cord exits at a distal end 34, it is subject to the same stresses and wear that the underlying strain relief is supposed to reduce. Without a suitably flexible strain relief in such an area, the cord is likely to make a sharp bend whenever it is tugged off its axis, which can cause cord conductor damage. Because the strain relief of other devices are made from the same semi-rigid materials, they can have the same problems at the cord exit. Even if the designs include cutouts in the tubular extension area of their strain relief to make it more flexible, these cutouts are not as effective as they might be due to the use of semi-rigid material. Moreover, the semi-rigid material is brittle, causing the cutouts to crack over time and fail. Once the strain relief cracks, sharp bends of the cord become likely at the failure point.

Therefore, a strain relief is needed at the cord exit from any semi-rigid or rigid device component, such as a handle. The strain relief is preferably both flexible enough to form the cord into a gradual bend as it is tugged, while at the same time being resilient enough to prevent the cord from forming sharp bends. What is needed is an improved cord tender assembly for a carpet seaming iron that both tends the cord to the left or the right away from the working area at the back of the iron, while also providing effective strain relief in the attached power cord.

SUMMARY

In one embodiment, a carpet seaming iron comprises a bimetal thermostat, a base assembly having an elevated surface for securing the bimetal thermostat laterally with respect to a plane of the base assembly, and a top cover coupled to the base assembly, the top cover securing the bimetal thermostat to the base assembly. Similarly, an over-temperature cutoff may be mounted between the base assembly and the top cover. In another embodiment, the carpet seaming iron includes a thermistor and a thermistor cover configured to fit over the thermistor, rather than the bimetal thermostat, and the thermistor and thermistor cover are secured between the base assembly and top cover. In this way embodiments of the carpet seaming iron fasten the necessary components to the base of the iron, such as a bimetal thermostat, an over-temperature cutoff, and/or a thermistor, without requiring a hole and fastener through the base of the iron.

In another embodiment, a carpet seaming iron comprises a base having an outer groove, a top cover that fits over the base with at least a portion of the top cover in the outer groove of the base, and a heating element thermally coupled to the base and one or more components for controlling the heating element disposed between the base and the top cover within the outer groove. Embodiments of the carpet seaming iron thus form a seal between the base of the iron and the heat shield, protecting the components of the iron, without requiring a gasket or equivalent structure therebetween.

In another embodiment, a carpet seaming iron comprises a base assembly having a heating element, the base assembly configured for operation of the carpet seaming iron in a first axis, a handle assembly attached to the base heating assembly, and a cord electrically coupled to the heating element of the base assembly through the handle assembly. To keep the cord away from a user during operation, the iron further comprises a rotatable cord guard holder comprising a rigid swivel member that is rotatably coupled to the handle about the first axis, the rotatable cord guard holder extending the cord in a direction at an angle to the first axis, along with a semi-rigid cord guard coupled to the cord where the cord extends from the rotatable cord guard holder, the cord guard reducing bending of the cord where the cord guard is coupled to the cord. Embodiments of the carpet seaming iron thus provide a cord tender assembly that both tends the cord to the left or the right away from the working area at the back of the iron, while also providing effective strain relief in the attached power cord.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 3:
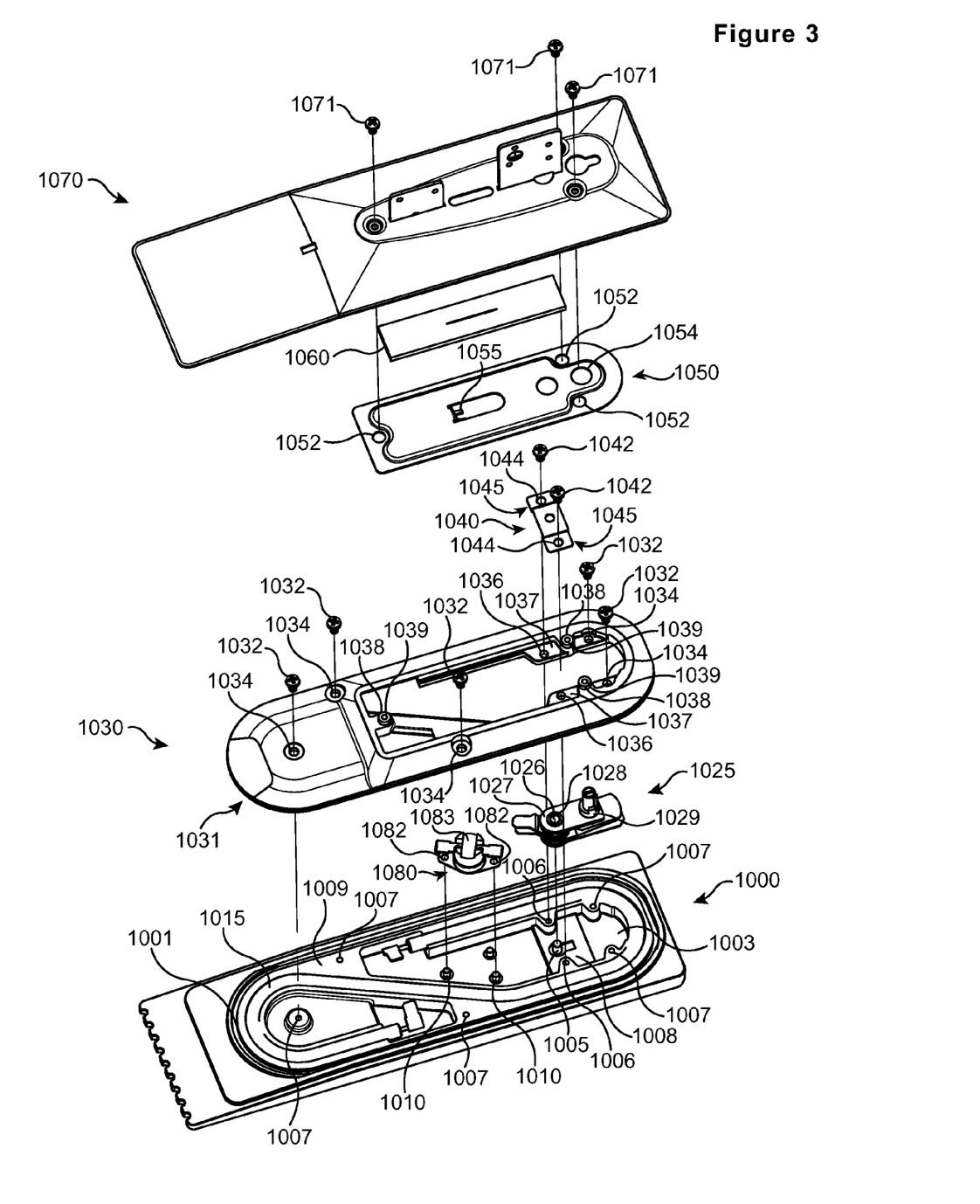
FIG. 3 is an exploded assembly view of a lower portion of a carpet seaming iron having a bimetal thermostat and over-temperature cutoff fastening system, in accordance with an embodiment of the invention.

To provide an improved means of fastening a bimetal thermostat or over-temperature cutoff to the base of the iron, posts may be formed in a top surface of the base where such components are preferred to be positioned, as shown in FIG. 3. Base 1000 includes a surface 1003 at a first elevation of a recess that provides clearance for installing these components. Base 1000 includes a post 1005 to for mounting bimetal thermostat 1025. Base 1000 includes another pair of posts 1010 for mounting an over-temperature cutoff 1080. Base 1000 includes an "S-shaped" groove (not shown) for inserting heating element 1015.

A bimetal thermostat 1025 typically is constructed with a through hole 1026. In prior art irons, a fastener is passed through hole 1026 to fasten it to the base. In one embodiment of the invention, bimetal thermostat 1025 is placed on a surface 1008 with a post 1005 inserted into hole 1026, instead of a fastener. Surface 1008 is slightly elevated from bottom-most surface 1003 to provide operating clearance for a lower arm (best seen as lower arm 13 of bimetal thermostat 10 in FIG. 1) of the bimetal thermostat 1025. Post 1005 is a first hold point to fix the position of bimetal thermostat 1025 at its back end 1027. Next element cover 1030 covering heating element 1015 is fastened to base 1000 by means of five screws 1032 passing through five holes 1034 and fastening into five tapped holes 1007 of base 1000. Five holes 1007 are drilled and tapped into a surface 1009 corresponding to a second, higher elevation on base 1000. The thicker cross-section of this area is more than sufficient for the formation of the necessary threads. By contrast, the cross section of the base at surface 1003 or surface 1008, corresponding to typical locations for the tapped hole for a screw holding the bimetal thermostat (or thermistor bracket) of prior art irons is comparatively thin and insufficient for the formation of the necessary threads.

After the fastening of top cover 1030 to base 1000, a bracket 1040 is placed on a top surface 1028 of bimetal thermostat 1025. Bracket 1040 is then fastened to top cover 1030 by two screws 1042 passing first through two holes 1044 in bracket 1040 and then passing through two holes 1036 of top cover 1030. Two screws 1042 are then fastened into two tapped holes 1006 of base 1000. The two tapped holes 1006 are also formed into surface 1009 at the second, higher elevation on base 1000 that is suitable for forming threads.

Bracket 1040 once tightened down in this manner bears upon top surface 1028 of bimetal thermostat 1025, holding it down as a second hold point. The pressure created by bracket 1040 on a top surface 1028 of bimetal thermostat 1025 is made possible by the controlled height of surfaces 1037 in relation to top surface 1028 of bimetal thermostat 1025. When bracket 1040 is initially placed on a top surface 1028 of bimetal thermostat 1025, there is a small amount of clearance between its bottom surfaces 1045 and surfaces 1037 of element cover 1030. Thus, when bracket 1040 is tightened down with screws 1042, a tension is created effectively strapping bimetal thermostat 1025 down.

Next in the assembly top cover 1050 is placed on element cover 1030 such that three element cover posts 1038 extend through three holes 1052 of top cover 1050. Top cover 1050 additionally has a precision thermostat hole 1054 which closely fits a collar 1029 of bimetal thermostat 1025, forming a third hold point. Bimetal thermostat 1025 is thus prevented from pivoting to the left or right by the precision fit of bimetal thermostat collar 1029 being surrounded by thermostat hole 1054 of top cover 1050.

As shown in FIG. 3, next an insulator pad 1060 is affixed to a top surface of top cover 1050. Afterwards, a heat shield 1070 is placed over the three element cover posts 1038. Heat shield 1070 is fastened to element cover 1030 by three screws 1071 being fastened into three tapped holes 1039 of element cover 1030. This in turn fastens top cover 1050 down on element cover 1030

An improved means to fasten an over-temperature cutoff is also shown in FIG. 3. In prior art irons, as shown in FIG. 2, fasteners such as fasteners 31 were used to fasten an over-temperature cutoff 30 by passing them through holes 32 and fastening them in tapped holes in the base. In one embodiment of the invention, as shown in FIG. 3, a pair of posts along with a tab formed in the top cover are used to position and hold down an over-temperature cutoff. Over-temperature cutoff 1080 includes two holes 1082 and a flat 1083 in its top surface. Over-temperature cutoff 1080 is mounted on base 1000 with two posts 1010 of base 1000 extending through two holes 1082 of over temperature cutoff 1080. The two posts 1010 form two hold points for over-temperature cutoff 1080, preventing it from turning in any direction.

Furthermore, when top cover 1050 is placed on element cover 1030 with three posts 1038 extending through three holes 1052, a tab 1055 of top cover 1050 contacts flat 1083 in the top surface of over-temperature cutoff 1080. Top cover 1050 is then fastened down with heat shield 1070 by three screws 1071 fastening into three tapped holes 1039 of element cover 1030. After top cover 1050 is fastened, tab 1055 of top cover 1050 generates sufficient pressure on flat 1083 of over-temperature cutoff 1080 to securely hold it down. Thus tab 1055 forms a third hold point for over-temperature cutoff 1080.

Figure 4:
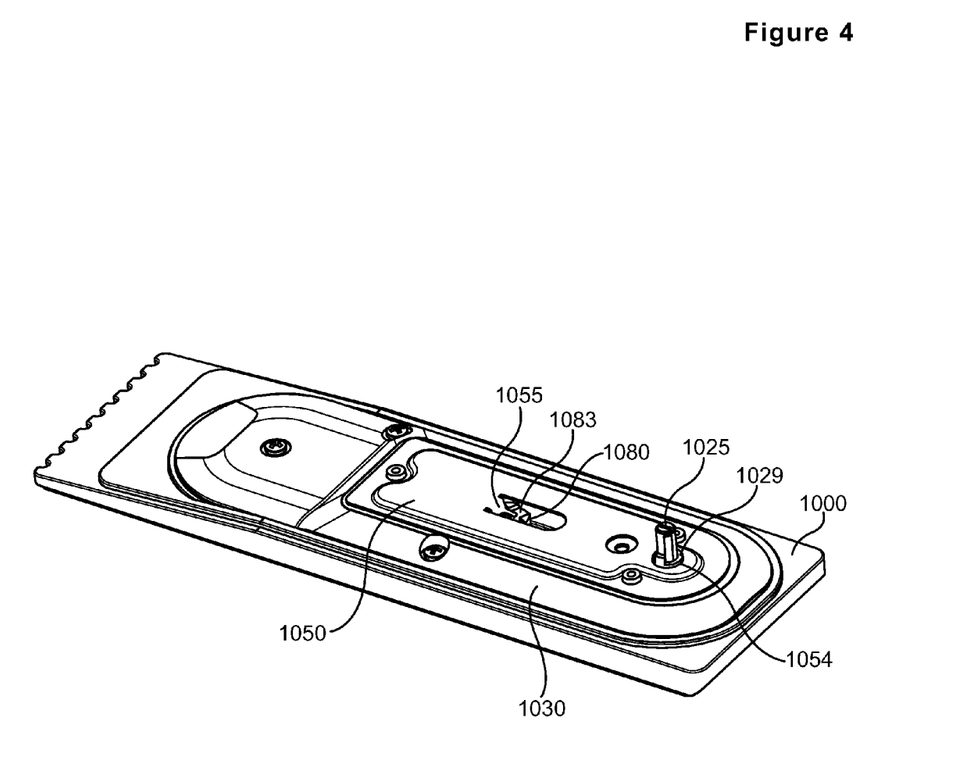
FIG. 4 is a perspective view of the lower portion of a carpet seaming iron of FIG. 3, assembled, in accordance with an embodiment of the invention.

FIG. 4 shows a perspective view of the assembly up to the point where top cover 1050 has been placed on top of element cover 1030. This view shows the close fit of thermostat hole 1054 of top cover 1050 with collar 1029 of bimetal thermostat 1025. This close fit prevents bimetal thermostat 1025 from moving to the left or to the right. This view also shows tab 1055 contacting a flat 1083 in the top surface of over-temperature cutoff 1080. Tab 1055 holds over-temperature cutoff 1080 down onto the interior surface of base 1000 where it is positioned (as by posts 1010 in FIG. 3).

The improved means of fastening components such as a thermostat or over-temperature cutoff to the base of carpet seaming iron (such as shown in FIG. 3) can be used to improve most all prior art irons. Benefits might include reduced scrap and less field failures resulting from no longer needing to tap a hole in a thin cross-section of the base.

Figure 7:
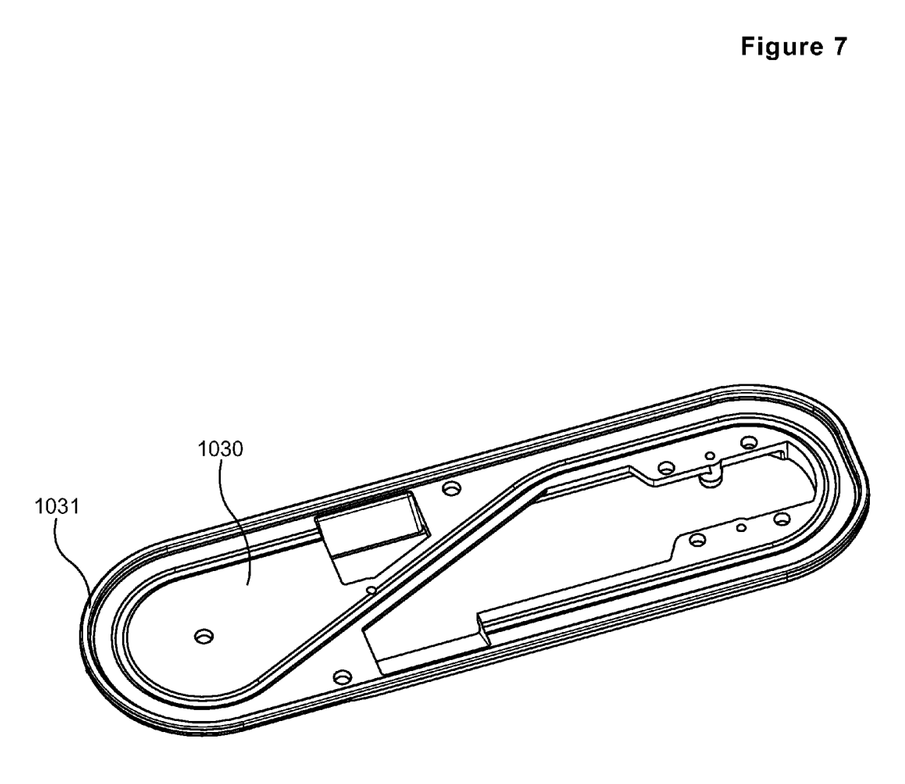
FIG. 7 illustrates an element cover of a carpet seaming iron, in accordance with an embodiment of the invention.

To provide an improved means of forming a seal in the gap area between the base of the iron and the heat shield, FIG. 3 shows that base 1000 includes an element cover groove 1001. Element cover 1030 has an element cover rib 1031 forming a close fit with element cover groove 1001 of base 1000. As better shown in FIG. 7, a view of element cover 1030 turned upside-down, element cover rib 1031 forms a raised edge surface around the perimeter of element cover 1030. As shown in FIG. 3, element cover rib 1031 seats within element cover groove 1001 of base 1000. When element cover 1030 is tightened down with pressure from all the fasteners shown (including five top cover fasteners 1032, two bracket fasteners 1042, and three heat shield fasteners 1071), element cover rib 1031 forms an effective seal with element cover groove 1001 of base 1000. Thus, a seal is created which is located in the gap between heat shield 1070 and base 1000 which does not require the gasket of prior art irons as previously discussed. Because this iron does not require such a gasket, the area above the element cover 1030 can be open for improved airflow. This helps reduce heat transfer between base 1000 and heat shield 1070, protecting the carpet from damage.

Figure 5:
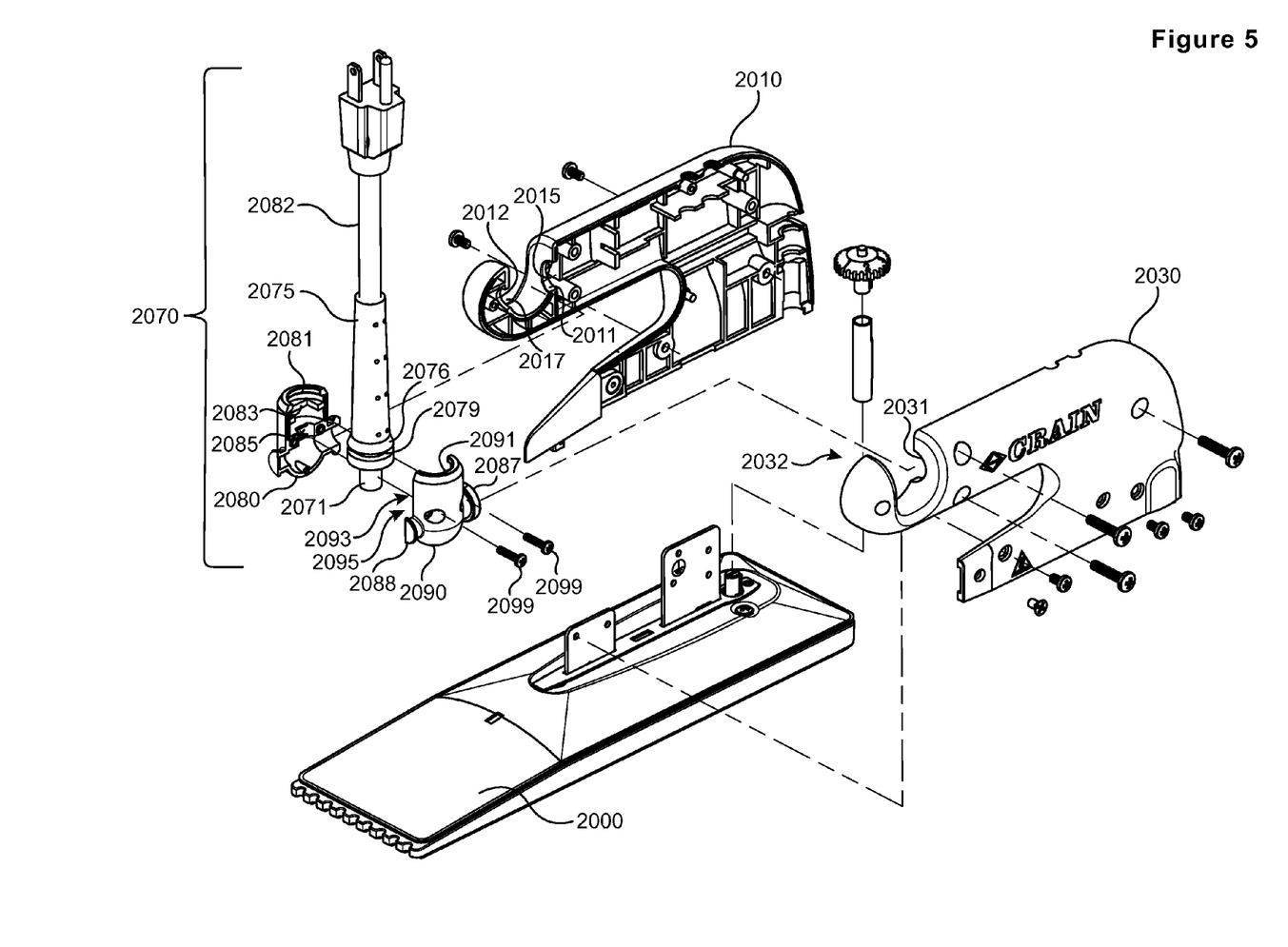
FIG. 5 is an exploded assembly view of a handle assembly of a carpet seaming iron with a cord guard assembly, in accordance with an embodiment of the invention.

To provide an improved cord tender for a carpet seaming iron, an improved rotatable cord guard assembly 2070 is shown in FIG. 5. As viewed from the back of the iron, a left handle half 2010 and a right handle half 2030 are being assembled onto heat shield 2000. Prior to fastening these handle halves, rotatable cord guard assembly 2070 is sub-assembled. Rotatable cord guard assembly 2070 includes cord guard 2075 (referred to a "strain-relief" by consumers but as a cord guard in industry). Cord guard 2075 is positioned near an end portion of an elongate power cord 2082. Rotatable cord guard assembly 2070 includes a left cord guard holder 2080 and a right cord guard holder 2090.

Internally, left cord guard holder 2080 and right cord guard holder 2090 have certain symmetrical features, such that when fastened together, they form two pairs of holding surfaces on cord guard 2075 and one pair of holding surfaces on cord jacket surface 2071 of power cord 2082. A first pair of inside edges 2081, 2091 bear on a flanged surface 2076 of cord guard 2075. Secondly, a square shape 2083 on left cord guard holder 2080 and a round shape 2093 of right cord guard holder 2090 insert within a "half-round" groove 2079 formed in cord guard 2075. The square shape 2083 bears against a flat (not shown) on "half-round" groove 2079. Cord guard 2075 is thus keyed internally within left cord holder 2080 and right cord holder 2090 to prevent it from rotating. Lastly, a pair of ribs 2085, 2095 grip cord jacket 2071. These features of left cord guard holder 2080 and a right cord guard holder 2090 once fastened together as by two screws 2099 securely grip cord guard 2075 and power cord 2082, preventing it from pulling out of the assembly.

Once left cord guard holder 2080 and right cord guard holder 2090 are fastened together, they form cylindrical-shaped forward flange 2087 and a rearward flange 2088. Forward flange 2087 fits in a forward hole 2015 formed by rounds 2011 and 2031 (of left handle half 2010 and a right handle half 2030 respectively). The small diameter area of forward flange 2087 rotatably fits within forward hole 2015, while the larger diameter rim fits behind forward hole 2015 and is held in place against the inner wall behind rounds 2011 and 2031. Similarly, rearward flange 2088 fits in a rearward hole 2017 formed by two rounds 2012 and 2032. The small diameter area of rearward flange 2088 rotatably fits within rearward hole 2017, while the larger diameter rim fits behind reward hole 2017 against the inner wall formed by rounds 2012 and 2032.

Figure 6:
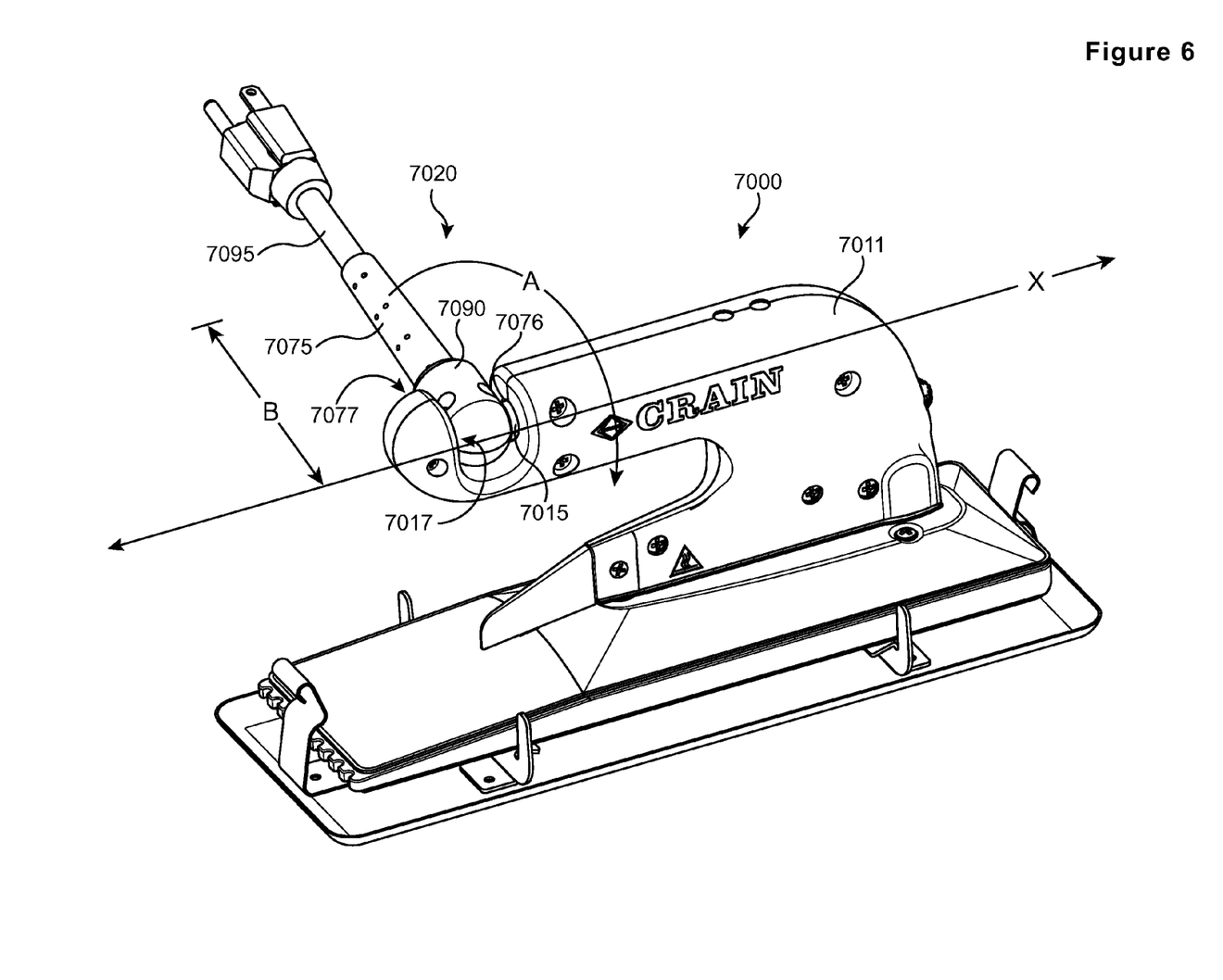
FIG. 6 is a perspective view of the carpet seaming iron with the handle assembly and cord guard assembly of FIG. 5, assembled, in accordance with an embodiment of the invention

FIG. 6 shows the fully-assembled improved carpet seaming iron 7000 including a rotatable cord guard assembly 7020. As shown, axis X defines a first axis of operation of the carpet seaming iron 7000. Cord guard holder 7090 extends cord 7095 at an angle to axis X. Rotatable cord guard assembly 7020 will rotate approximately 180 degrees along arc A on the axis of forward flange 7015 and rearward flange 7017. Because rotatable cord guard assembly 7020 can tend the cord to the left or the right such that is out of the user's way, it performs the function of prior art cord tenders without the drawbacks. The power cord 7095 will be extended a distance B to the left or right from the centerline of carpet seaming iron 7000. While flexible cord guard 7075 is flexible, it is still resilient enough to extend power cord 7095 by distance B it extends from cord guard holder 7090.

Furthermore, rotatable cord guard assembly 7020 is rotatably connected to handle assembly 7011 at two holes 7076, 7077 which form two points of rotation. This increases the strength of handle assembly 7011 and rotatable cord guard assembly 7020 to resist strong pulls on power cord 7095, possible leveraging of cord guard 7075, or unforeseeable impact forces.

Furthermore, rotatable cord guard assembly 7020 is comprised of multiple components that can be manufactured from different materials that are suitable for their respective functions. Cord guard holder 7090 (formed similarly to the embodiment of FIG. 5 by a left cord guard holder 2080 and a right cord guard holder 2090) could be molded from a rigid and hard material such as fiberglass reinforced nylon plastic. Such a material is suitable for holding flexible cord guard 7075 from pulling out, as well as for repeated rotation wear within two holes 7076, 7077. Flexible cord guard 7075 itself can be flexible and can be formed from a comparatively soft material, such as thermoplastic rubber.

The use of a flexible cord guard 7075, in one embodiment, ensures that a gradual bend will naturally form in the power cord 7095 whenever it is tugged off its axis. By contrast, with the semi-rigid strain relief of previous devices, the cord may form a sharp bend past the cord exit point and thus more likely to cause cord failure.

Figures 8, 9:
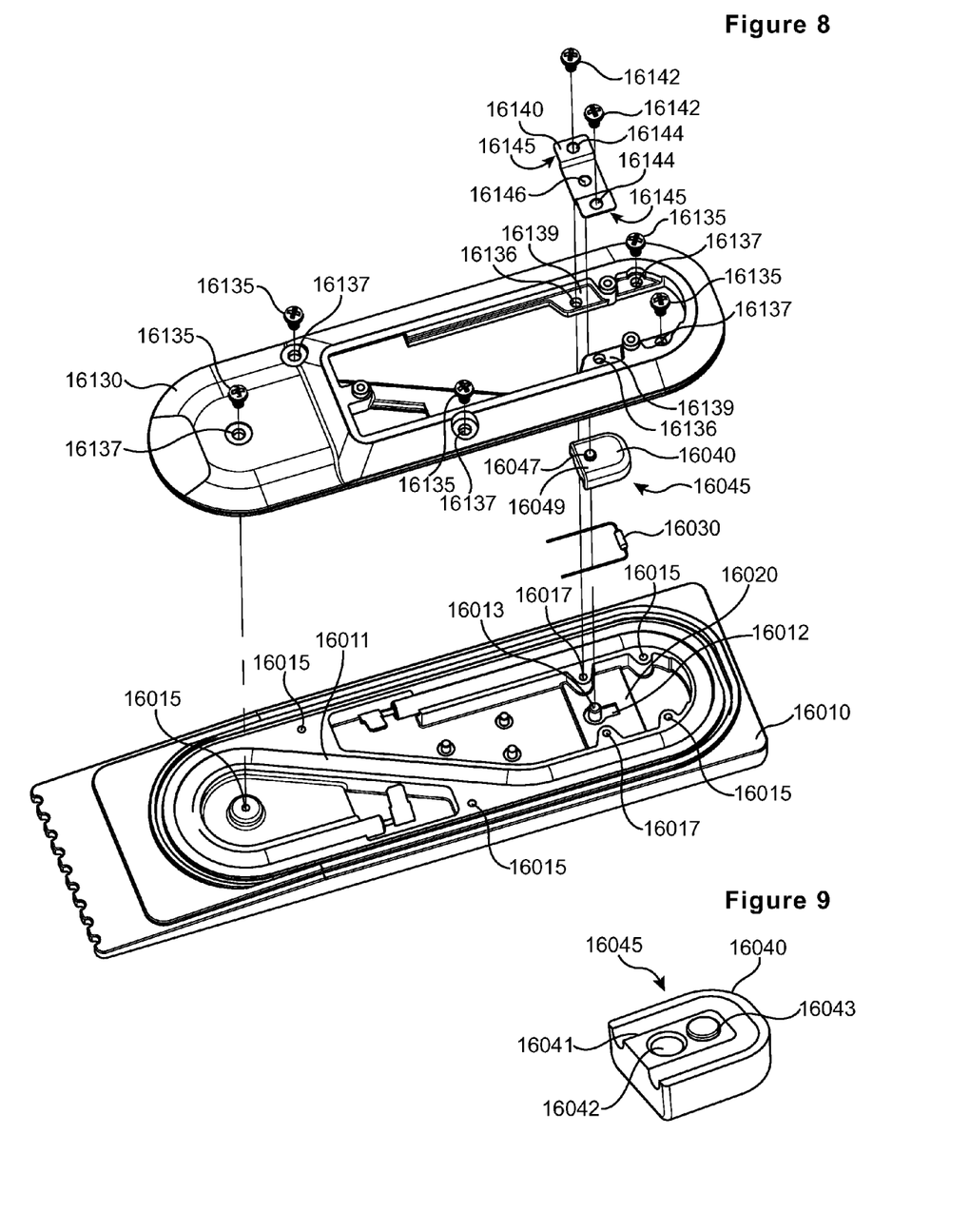
FIG. 8 is an exploded assembly view of a lower portion of a carpet seaming iron having a thermistor fastening system, in accordance with an embodiment of the invention
FIG. 9 is a perspective view of the thermistor cover of FIG. 8, in accordance with an embodiment of the invention.

FIG. 8 shows an alternative embodiment showing several elements in common with those of the thermostat and over-temperature cutoff fastening system of FIG. 3. However, in the embodiment of FIG. 8 they are assembled in a slightly different manner to fasten a thermistor-type temperature-sensing device to the iron base. A thermistor may be used when an electronic control circuit is employed for iron temperature control.

A thermistor 16030 is placed at surface 16020 of base 16010. Base 16010 is similar to base 1000 (FIG. 3). A thermistor holder 16040 having a bottom surface 16045 conforming to the profile of thermistor 16030 is placed on top of thermistor 16030. As more clearly shown in FIG. 9, thermistor cover 16040 has a bottom surface 16045 including a groove 16041 for holding thermistor 16030 (FIG. 8). Thermistor cover 16040 additionally includes a blind hole 16042 which accepts post 16013 of base 16010 (FIG. 8), and a boss 16043 which enters slot 16012 (of base 16010, FIG. 8). Thus, blind hole 16042 of thermistor cover 16040 accepts post 16013 of base 16010 (FIG. 8) as a first hold point. Boss 16043 enters slot 16012 (of base 16010, FIG. 8) as a second hold point to prevent thermistor cover 16040 from rotating. As shown in FIG. 8, thermistor cover 16040 additionally has a boss 16047 on a top surface 16049.

Element cover 16130 covering element 16011 is next fastened to base 16010 as by five screws 16135 passing through five holes 16137 and fastening into five tapped holes 16015 of base 16010. Element cover 16130 is similar to element cover 1030 (FIG. 3). Next a bracket 16140 is placed on top of thermistor cover 16040 with a boss 16047 extending through center hole 16146 of bracket 16140. Center hole 16146 cooperates with boss 16047 of thermistor cover 16040 as a third hold point to prevent thermistor cover 16040 from rotating. Bracket 16140 is similar to bracket 1040 (FIG. 3) except for that it is turned upside down. Bracket 16140 is fastened down by two screws 16142 passing first through bracket holes 16144. Two screws 16142 then pass through two holes 16136 in element cover 16130 and fasten into two tapped holes 16017 of base 16010.

Bracket 16140 once tightened down in this manner bears upon top surface 16049 of thermistor cover 16040, holding it down as a fourth hold point. A slight amount of pressure created by bracket 16140 on a top surface 16049 of thermistor cover 16040 is made possible by a controlled height of surfaces 16139 in relation to a top surface 16049 of thermistor cover 16040. When bracket 16140 is placed on a top surface 16049 of thermistor cover 16040, there is a small amount of clearance between bottom surfaces 16145 of bracket 16140 and surfaces 16139 of element cover 16130. Thus, when bracket 16140 is tightened down with screws 16142, a slight tension is created effectively strapping thermistor 16030 and thermistor cover 16040 down with light pressure.

With this design, base 1000, element cover 1030, and bracket 1040 of the bimetal thermostat assembly of FIG. 3 could be common to the base 16010, element cover 16130, and bracket 16140 of the thermistor assembly and their fasteners could also be common. In the thermistor assembly of FIG. 8, surfaces 16139 are at a suitable elevation for fastening a bracket 16140 that holds down thermistor cover 16040 and thermistor 16030. This elevation is the same as that of surfaces 1037 in element cover 1030 in FIG. 3, which cooperate with bracket 1040 to fasten down bimetal thermostat 1025. The use of common components can reduce manufacturing cost.

A person skilled in the art might envision certain variations of the embodiments. For example, the embodiment of FIG. 3 includes a base 1000, element cover 1030, a top cover 1050, and a heat shield 1070. Some embodiments may omit the element cover and mount the heat shield directly to the base by means of a heat shield mounting bracket. Other embodiments may have an element cover and mount the heat shield to the element cover, but omit the top cover. As used herein, a base assembly for a carpet seaming iron may include an iron base and any other components in the carpet seaming iron that are directly or indirectly connected to the iron base. FIG. 4 is an example of a base assembly including the elements of the embodiment of FIG. 3.

Furthermore, the bracket 1040 of FIG. 3, which functions to contact the top of bimetal thermostat 1025 to secure it to base 1000, might be included as an added feature on other of the components. For example, a shape similar to bracket 1040 might be formed as an integral bracket-like feature of a component similar to element cover 1030, such that securing such an element cover to the iron base causes its bracket-like feature to contact the top of the bimetal thermostat to secure it to the base. Similarly, an added bracket-like feature might be formed in a component similar to top cover 1050, such that securing the top cover to a part like element cover 1030 (or directly to the iron base) caused its bracket-like feature to secure the bimetal thermostat to the base. An added bracket-like feature might also be formed in a component similar to heat shield 1070, such that securing the heat shield to a part like element cover 1030 (or directly to the iron base) caused its bracket-like feature to secure the bimetal thermostat to the base. As used herein, a bimetal thermostat top cover may include a component fastenable (as by other fastening components which may couple it) to a portion of the base assembly to contact the top surface of a bimetal thermostat to secure the bimetal thermostat to the base assembly of a carpet seaming iron. Thus, a bimetal thermostat top cover may a separate component, or it may be an added feature of the element cover, top cover, or heat shield.

Similarly, FIG. 8 includes a bracket 16140 that secures thermistor cover 16040 and thermistor 16030 to base 16010. A shape similar to bracket 16140 may be added to any of element cover 16130, a top cover such as top cover 1050 (FIG. 3), or a heat shield such as heat shield 1070 (FIG. 3) to secure a thermistor cover and thermistor to an iron base. As used herein, a thermistor cover bracket may include a component fastenable (as by other fasteners that couple it) to a portion of the base assembly to contact a thermistor cover that secures a thermistor to the base assembly of a carpet seaming iron.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A carpet seaming iron configured for operation in a first axis, the carpet seaming iron comprising:
    a base assembly having a heating element and a bottom base surface defining a substantially longitudinal plane;
    a handle assembly attached to the base assembly, the handle assembly including a left handle portion and a right handle portion, the handle assembly forming a forward hole and a rearward hole that is positioned rearward of the forward hole along the first axis;
    a cord electrically coupled to the heating element of the base assembly through the handle assembly, at least a portion of the cord passing between the left handle portion and the right handle portion;
    a rotatable cord guard holder comprising a rigid swivel member that is rotatably coupled to the handle assembly such that the rigid swivel member is rotatable in a plane that is substantially perpendicular to the longitudinal plane of the bottom base surface, the rotatable cord guard holder extending the cord in a direction at an angle to the first axis, the rigid swivel member including a forward flange rotatably inserted into the forward hole of the handle assembly and a rearward flange rotatably inserted into the rearward hole of the handle assembly; and
    a cord guard coupled to the cord and insertable in the rotatable cord guard holder, the cord guard less rigid than the rotatable cord guard holder to reduce bending of the cord where the cord guard is coupled to the cord.

2. The carpet seaming iron of claim 1, wherein the cord guard is inserted into the rotatable cord guard holder through a hole in the rotatable cord guard holder positioned between the forward flange and rearward flange of the rotatable cord guard holder.

3. The carpet seaming iron of claim 1, wherein the handle assembly forms a recess in its top surface, the recess including a forward wall and a rearward wall, the forward hole formed in the forward wall and the rearward hole formed in the rearward wall, the rotatable cord guard holder insertable and rotatable within the recess.

4. The carpet seaming iron claim 1, wherein the rotatable cord guard holder includes a ribbed surface that grips a cord jacket of the cord.

* * * * *